No. 783,428. Patented February 28, 1905.

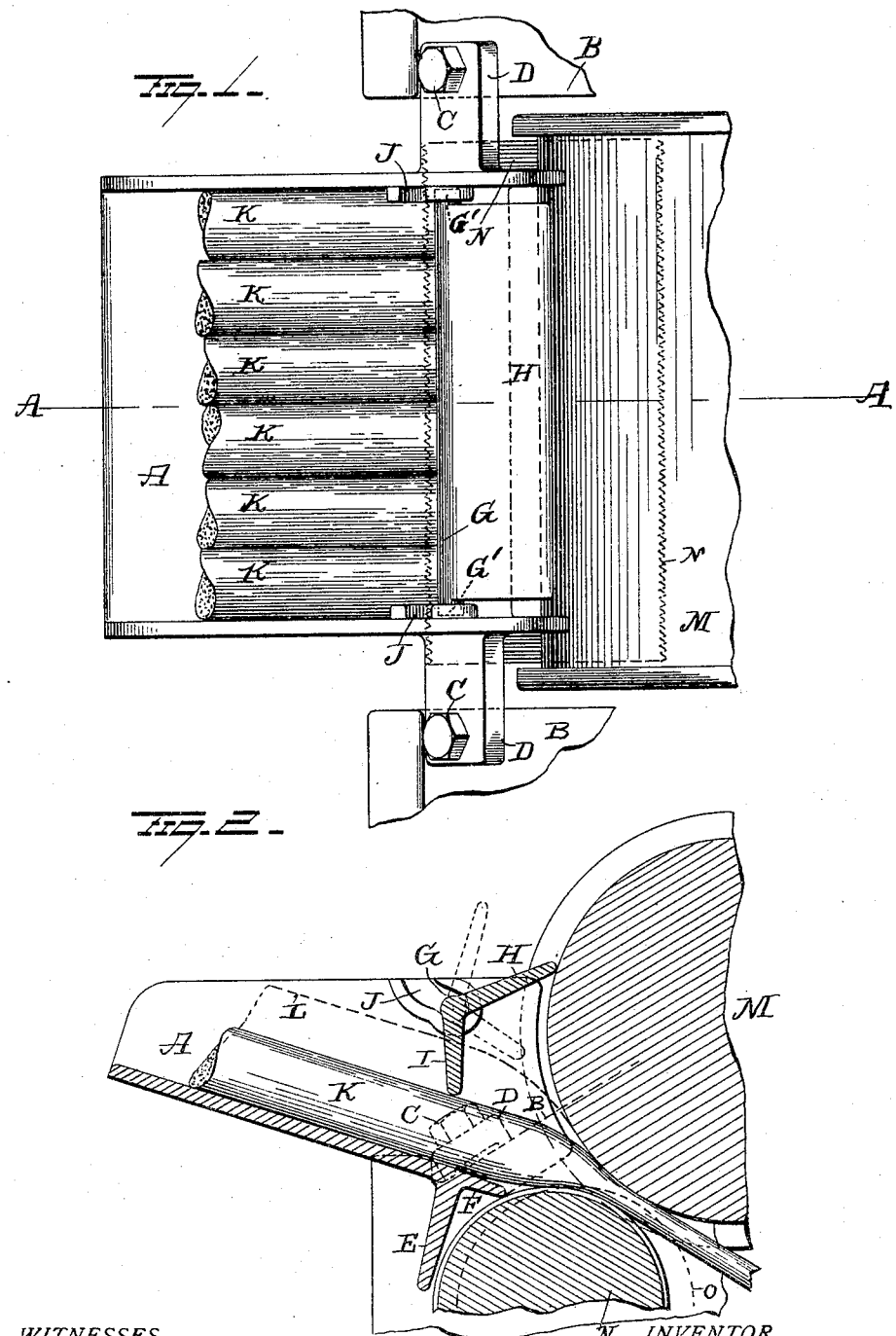

UNITED STATES PATENT OFFICE.

JOHN PORTER GOLDEN, OF COLUMBUS, GEORGIA.

FEED-BOX FOR CANE-MILLS.

SPECIFICATION forming part of Letters Patent No. 783,428, dated February 28, 1905.

Application filed July 26, 1904. Serial No. 218,231.

*To all whom it may concern:*

Be it known that I, JOHN PORTER GOLDEN, a resident of Columbus, in the county of Muscogee and State of Georgia, have invented certain new and useful Improvements in Feed-Boxes for Cane-Mills; and I do hereby declare the following to be a full, clear, and exact description of the invention, such as will enable others skilled in the art to which it appertains to make and use the same.

My invention relates to an improved feed-box for horizontal cane-mills, the object of the invention being to provide an improved feed-box which will prevent back-squirting of juice regardless of the size of the canes being fed; and the invention consists in certain novel features of construction and combinations and arrangements of parts, as will be more fully hereinafter described, and pointed out in the claims.

In the accompanying drawings, Figure 1 is a plan view of the box with attachments. Fig. 2 is a section at line A A.

My invention is designed as an improvement over the ordinary style of power cane-mills where the cane is fed through a feed-box between a set of rolls, the first pair consisting of a large smooth-faced roll with a small grooved roll, the small roll being provided with means of adjustment for distance between rolls, which is about one-quarter inch when normal to one-half inch, if desired. The diameter of small roll being about one-half inch smaller than the pitch diameter of gears' driving-roll allows gears to run at pitch-line with one-quarter inch space between rolls normally.

The objection to the ordinary style of feed-box has been that the juice from the pressed-cane stalks would squirt back from above and below box, thus wasting a good deal of juice that would fall outside of mill.

My improvement consists in a feed-box A, attached to housings B B on each side, of the usual general construction, by cap-bolts C C, bolted to housings B B through lugs D D. On lower side of box, at a point near inner end thereof, is a projection or tongue E at right angles, or nearly so, to box-bottom, which allows fluted roll N to be adjusted for desired opening between rolls, and yet with extension of feed-box bottom F guards against juice squirting out under box. To guard against juice squirting out above box, I pivot a double guard, consisting of top plate H and bottom plate I, so arranged in relation to cane being fed in between rolls that with a normal-sized stalk, as K, the upper plate rests against large roll M, while the lower plate stands in nearly a vertical position, the two plates stopping the juice that otherwise squirts out above box and is lost. Should the cane-stalk be larger than ordinary, as per outline L, the guard would swing up, as per dotted line, and still prevent wasting of juice. The guard G is provided at its respective ends with short trunnions G', as shown in Fig. 1, which rest in slots J, made in enlargements on the inner face of each side of the feed-box, and said slots are so constructed that the guard cannot become displaced during the operation of the machine, but will permit it to be removed, if necessary.

A great many changes might be made in the general form and arrangement of the parts described without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. A feed-box for horizontal cane-mills whose sides and bottom extend in nearly to face of rolls and having a projection at right angles or nearly so to the box-bottom, to keep juice from squirting back of box as cane is fed between rolls.

2. The combination with the feed-box of a horizontal cane-mill, of a self-adjusting juice-guard therein having upper and lower plates to guard against juice squirting out over the top of the box without regard to the size of the cane being pressed.

3. The combination of a feed-box for horizontal cane-mills, having irregularly-shaped slots on inside of feed-box a juice-guard mounted in said slots over the path of the cane.

4. In a feed-box for cane-mills, the combination of a juice-deflecting tongue on the bottom thereof, a movable angle-guard, trunnions on the ends of said guard, and enlargements on the inner faces of opposite sides of the box having irregular slots to receive said trunnions.

5. In a cane-mill, the combination with the rolls and a feed-box, of a juice-guard pivotally supported in the feed-box and comprising two plates disposed at an angle to each other, one of said plates terminating over the path of the cane and the other plate projecting toward one of the rolls.

In testimony whereof I have signed this specification in the presence of two subscribing witnesses.

JOHN PORTER GOLDEN.

Witnesses:
C. D. McPhail,
N. L. Dudley.